Nov. 6, 1962 N. E. STEHLE 3,062,564
AIR COOLED FITTING FOR DUCT OR HOSE
Filed March 15, 1960
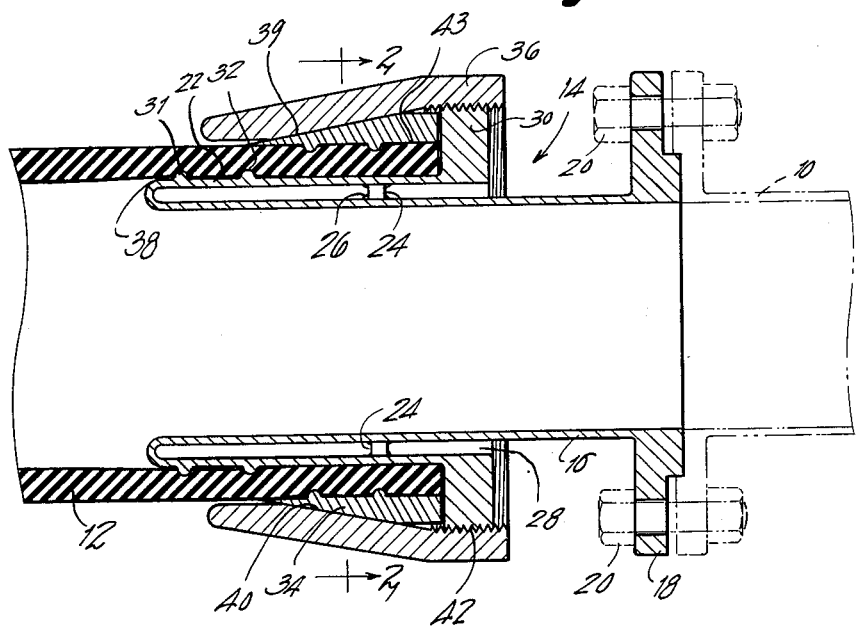
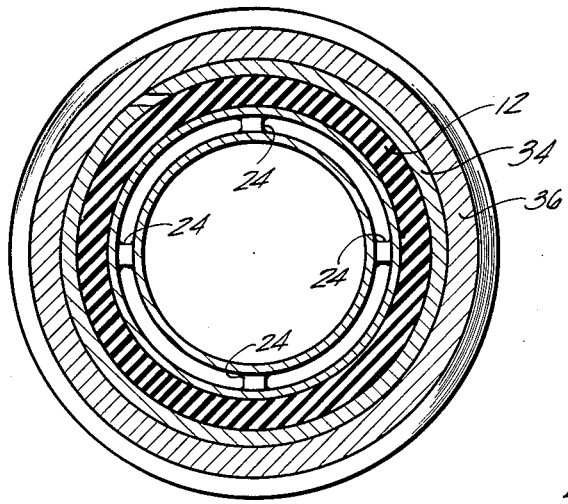
INVENTOR.
Norman E. Stehle
BY
Arthur W. Collins
Attorney

United States Patent Office 3,062,564
Patented Nov. 6, 1962

3,062,564
AIR COOLED FITTING FOR DUCT OR HOSE
Norman E. Stehle, Glen Mills, Pa., assignor to the United States of America as represented by the Secretary of the Navy
Filed Mar. 15, 1960, Ser. No. 15,245
1 Claim. (Cl. 285—41)
(Granted under Title 35, U.S. Code (1952), sec. 266)

The invention described herein may be manufactured and used by or for the Government of the United States of America for governmental purposes without the payment of any royalties thereon or therefor.

This invention relates to connectors or end fittings for joining a flexible hose to a conduit or other means and particularly to the connection between the hose and fitting.

Such connections are customarily made by inserting a metallic tubular nipple into the hose end and securing both together by contracting the hose over the nipple with a clamp. Coupling between the nipple, and hose thereby, to the end of a conduit, compressor, or another device, is then made with threads, bolted flanges or other suitable means.

In conducting fluids at high pressure, for instance, at about 90 pounds per square inch at 600° F. as is usual in turbine starters, the connections described have been found to have a relatively short life. Without exception, the hose deteriorates and bursts at the nipple. Most of this failure has been traced to the high temperature of the nipple and that of the hose, thereby, at that point.

It is, as a consequence, an object of this invention to provide a fitting for a hose which will remain relatively cool at the connection between it and the hose whereby the life of the hose is enhanced.

It is a further object of this invention to provide a hose fitting having an air space which insulates the hose at the hose-fitting juncture.

Additionally, it is an object of this invention to provide a fitting with an insulating air space having provisions for limiting its insertion into the hose and thereby assuring access of air into the air space.

It is also an object of this invention to provide such a fitting with clamping means by which the tendency for the hose to blow off the fitting is reduced.

Broadly, the invention achieves its objectives by providing a jacket spaced around the nipple to which the hose is secured and which does not undergo contact with fluids passing through the hose. The jacket, thus, remains relatively cool as compared to the fluid conducting portion of the fitting.

The specific features of the invention, as well as additional objects and advantages, will become more apparent from the following description of one embodiment, when read in light of the accompanying drawing in which FIGURE 1 is a longitudinal sectional view of a hose and fitting utilizing the invention, and FIGURE 2 is a cross-sectional view taken on the line 2—2 of FIGURE 1.

More particularly, in the drawing there is shown a conduit 10 from a source of compressed, heated air (not shown) to which a flexible hose 12 is coupled by means of a metallic end fitting 14. The fitting has a tubular body 16 provided at one end with a radial, outwardly directed flange 18, or other suitable joining means, by which it may be secured to conduit 10 as by bolts 20. At the other end, or nipple end, the tubular body 16 is turned back on itself to form an outer jacket 22 which is spaced from it and thus defines with it an annular chamber 24. Struts 24' secured by welds 26 keep the jacket 22 and tubular body separated. The outward end of jacket 22 terminates at a point short of coupling flange 18 and defines with it an annular orifice 28 into air chamber 24 for atmospheric air. To prevent inserting the fitting too far into hose 12 and closing orifice 28 a stop is provided at the outward end of jacket 22, such as the radial outer flange 30. The usual hose retaining, axially spaced, annular beads or ridges 31 and 32 extend from the outer surface of jacket 22. Hose fitting 14 is inserted at its nipple end into hose 12 so that the end of the hose abuts flange 30.

Retention of hose 12 on jacket 22 is achieved by a clamping means preferably in the form of a wedge 34 and socket 36 which threads onto stop flange 30.

The wedge 34 may be in arcuate sections or, as shown, a split ring, triangular in cross-section which fits over the hose 10 with its base directed outward. The inner surface has beads or ridges 37 and 38 similar to those on jacket 22. Its axial length does not exceed that of the jacket portion between the outward ridge 32 and stop flange 30, which it overlies. Clamping action is thus restricted to this portion of the fitting and thereby eliminating any close contact between the hose 12 and the portion of jacket 22 inward of ridge 32. As a result a small separation 38 is created which further insulates some of the hose from the hot fitting.

The outer surface 39 of wedge 34 is frusto-conical and seats on an annular surface 40 on a forward inner surface portion of sleeve-like socket 36. The outer inner surface portion of socket 36 and stop flange 30 are secured together by threads 42. Turning socket 36 so as to thread on stop flange 30 decreases the space 43 between it and hose 12 thereby contracting wedge 34 and securing the hose onto jacket 22.

This form of fitting has proven to be quite successful in achieving its objectives. In use, with a clamp positioned as described, it has been determined the hose portion over jacket 22 had only a temperature of 350° F. as against 600° F. in the tubular body 16, and that the hose, at its juncture with the fitting, withstood approximately one thousand test cycles before failure. This is believed to be significant since hose failures at the fitting normal occurred at one hundred eighty-five cycles in cases using fittings without insulating air space. Likewise, the frequency of hose blowoffs from the fitting had been reduced. Obviously many modifications and variations of the present invention are possible in the light of the above teachings. It is therefore to be understood that within the scope of the appended claims the invention may be practiced otherwise than as specifically described.

What is claimed is:

An insulated coupling comprising a flexible hose, a tubular socket for receiving the end of said hose and having an internal conical surface adapted to surround said hose in spaced relationship and which tapers in a direction from the end of said hose inwardly and toward the axis thereof, a wedge member in said socket having an internal hose gripping surface and an external conical surface cooperating with said internal conical surface whereby movement of said socket in an axial direction toward the end of said hose radially moves said wedge into clamping engagement with said hose, a nipple member for insertion into said hose end having a tubular body with an insertion portion and an outer portion, said outer portion being adapted to be joined to a conduit means, a jacket surrounding the insertion portion of said tubular body in spaced relation thereto defining an air chamber therebetween and terminating short of said tubular body's outer end, said jacket and tubular body being integrally connected at their inner ends whereby said air chamber is closed at the inward end and opens to the atmosphere at its other end, support means disposed between said jacket and said body for maintaining them in spaced relation while permitting air passage into said air chamber, a flange integral with said jacket and extending from the outer end thereof, coating threads on said flange and in said socket for securing said socket to said jacket and moving thereof in said axial direction, said jacket being provided with a plurality of axially spaced ridges and the axial length of said wedge being such that clamping action thereby on said hose is restricted over a portion of said jacket outward of the second innermost ridge and so that a small separation is created between the inward end of said jacket and said hose.

References Cited in the file of this patent

UNITED STATES PATENTS

| | | | |
|---|---|---|---|
| 418,225 | Rice | Dec. 31, | 1889 |
| 919,444 | Loetzer | Apr. 27, | 1909 |
| 1,367,348 | Barnes | Feb. 1, | 1921 |
| 1,933,769 | Steele | Nov. 7, | 1933 |
| 2,015,081 | McElhany | Sept. 24, | 1935 |
| 2,127,073 | Topping | Aug. 16, | 1938 |
| 2,335,591 | Hansell | Nov. 30, | 1943 |
| 2,780,482 | Brown | Feb. 5, | 1957 |